United States Patent [19]

Ito

[11] 3,828,328

[45] Aug. 6, 1974

[54] MAGNETIC THIN FILM MEMORY

[75] Inventor: Kiyoo Ito, Kodaira, Japan

[73] Assignee: Hitachi, Ltd., Tokyo, Japan

[22] Filed: Dec. 29, 1971

[21] Appl. No.: 213,250

[30] Foreign Application Priority Data

Dec. 29, 1970 Japan ............................. 45-125961

[52] U.S. Cl.340/174 NC, 340/174 CR, 340/174 M, 340/174 DC, 340/174 LA

[51] Int. Cl. ............................................. G11c 7/02

[58] Field of Search.. 340/174 CR, 174 NC, 174 M, 340/174 DC, 174 LA

[56] References Cited

UNITED STATES PATENTS

| | | | |
|---|---|---|---|
| 3,274,570 | 9/1966 | Brekne | 340/174 M |
| 3,305,846 | 2/1967 | Amemiya | 340/174 DC |
| 3,319,233 | 5/1967 | Amemiya et al. | 340/174 M |
| 3,404,387 | 10/1968 | Amemiya | 340/174 DC |
| 3,500,360 | 3/1970 | Cassidy | 340/174 M |
| 3,530,445 | 9/1970 | Hsieh et al. | 340/174 NC |
| 3,593,321 | 7/1971 | Kraft | 340/174 M |

*Primary Examiner*—Stanley M. Urynowicz, Jr.
*Attorney, Agent, or Firm*—Craig & Antonelli

[57] ABSTRACT

In the magnetic thin film memory of the one-cross-per-bit type, in which the mutually opposite pair of digit lines comprised in a pair of memory arrays each including a plurality of memory planes are connected commonly to a sense amplifier and, during writing of information digit currents with mutually reverse polarities are supplied to the pair of digit lines;

a magnetic thin film memory characterized in that part of the digit lines of one of said memory arrays is disposed to run by way of at least one memory plane of the other memory array.

8 Claims, 3 Drawing Figures

INVENTOR

KIYOO ITO

BY Craig, Antonelli & Hill
ATTORNEYS

INVENTOR

KIYOO ITO

BY Craig, Antonelli & Hill
ATTORNEYS

MAGNETIC THIN FILM MEMORY

BACKGROUND OF THE INVENTION

The present invention relates to a large capacity memory of the type used for an electronic computer and the like, and more particularly to a magnetic thin film memory.

The magnetic thin film memory in general provides a plurality of digit lines comprising magnetic thin wires arranged in parallel with each other, and a plurality of word lines disposed in crossed relationship with said digit lines, thereby forming a matrix; and, information is stored in these cross-over points. The memory system in which one bit of information is stored in one memory cell at the cross-over point of one digit line and one word line is called a one-cross-per-bit system.

The matrix is disposed on a memory plane, and a plurality of memory planes constitute a memory array.

In the magnetic thin film memory of a one-cross-per-bit system, a pair of memory arrays are used, and the mutually opposite pair of digit lines of each of the digit line pairs comprised in the pair of memory arrays, are connected in common to a sense amplifier for writing information into the memory cell, digit currents with mutually reverse polarities are supplied to said pair of digit lines whereby the sense amplifier is protected against an excess voltage due to the digit current, the digit current noise is canceled, and the access time is reduced.

In this type of conventional magnetic thin film memory, certain ones of the pair of digit lines of the respective digit line pairs are disposed in parallel with each other so as to cross all the memory planes of one of the memory arrays. Similarly, the others of the pair of digit lines of the respective digit line pairs are disposed in parallel with each other so as to cross all the memory planes of the other memory arrays. In one of the memory arrays wherein a digit current with a certain specific polarity is flowing in a certain digit line, if a digit current with the same polarity flows in the adjacent digit line, the two digit lines are electromagnetically strongly coupled with each other over the full length, and the resultant induced current flows in each of the digit lines, to produce a so-called crosstalk. Such a crosstalk causes a serious reduction in the margin of the memory system.

SUMMARY OF THE INVENTION

A principal object of the present invention is to provide a magnetic thin film memory capable of enabling a memory system to be operable with a markedly improved margin.

Another object of the invention is to provide a digit line configuration for a magnetic thin film memory in which the crosstalk due to electromagnetic coupling is largely reduced.

In view of the above objects, the magnetic thin film memory of this invention is constituted in such a manner that the mutually opposite pair of digit lines are disposed so as to form cross-overs with each other and part of the digit lines in one of the pair of memory arrays is arranged to run by way of at least one memory plane of the other memory arrays.

DESCRIPTION OF THE PREFERRED EMBODIMENTS

Figure 1:
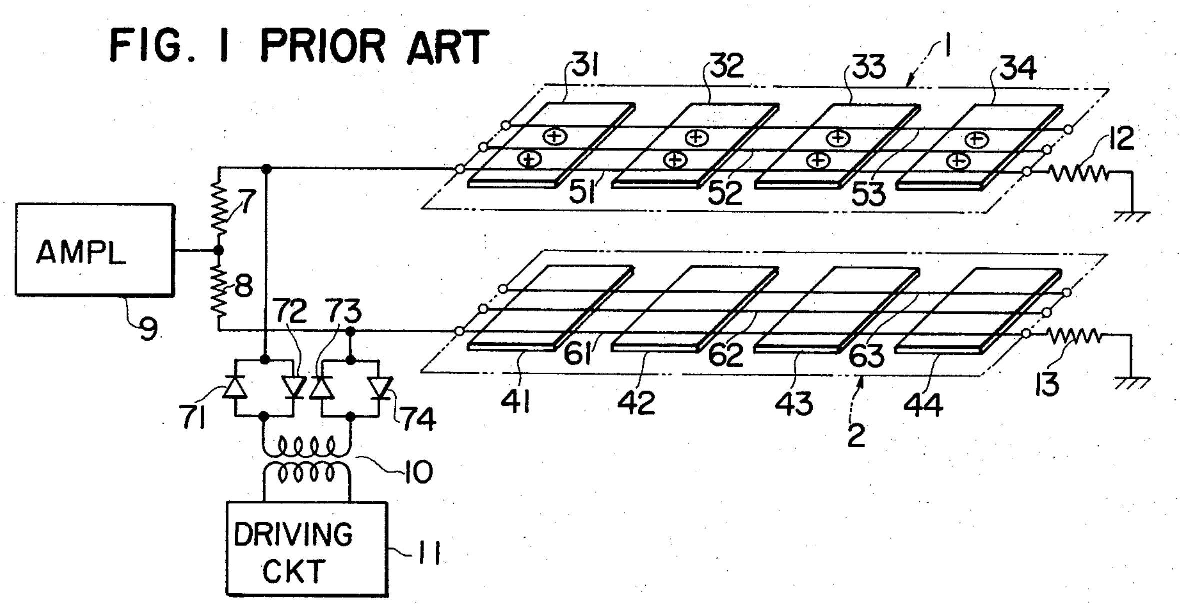
FIG. 1 PRIOR ART
FIG. 1 is a schematic diagram showing the arrangement of a conventional thin film memory.

Referring to FIG. 1, there is schematically shown a conventional magnetic thin film memory comprising two memory arrays 1 and 2. The memory arrays 1 and 2 consist of a plurality of memory planes 31 through 34 and a plurality of memory planes 41 through 44, respectively. A plurality of digit lines 51 through 53 and a plurality of digit lines 61 through 63 are disposed across the memory planes 31 through 34 and across the memory planes 41 through 44, respectively. These digit lines cross over the word lines (not shown).

The digit line 51 of the memory array 1 makes a pair with the opposite digit line 61 of the memory array 2. This digit line pair is connected in common to a sense amplifier 9 by way of resistors 7 and 8, and to a drive circuit 11 by way of absorption diodes 71 through 74 and a transformer 10.

The reference numerals 12 and 13 denote terminal resistors of the digit lines 51 and 61, respectively.

The digit lines 52 and 53 and their opposite digit lines 62 and 63 are arranged as in the case of digit lines 51 and 61, and disposed in the position adjacent to said first digit line pair.

This memory is operated in the following manner. When it is desired to write information therein, digit currents with mutually reverse polarities are supplied to the digit lines 51 and 61 from the drive circuit 11 by way of transformer 10 and absorption diodes 71 through 74, and a word current is supplied to the word lines whereby the information is written in a memory cell at the corresponding crossover point.

To read information, a word current is supplied to the word line, and a current corresponding to the written information is induced on the digit lines 51 or 61. The induced current is detected by the sense amplifier 9 whereby the information is read.

In the memory array 1, for example, it is assumed that a positive digit current is flowing in the digit line 51, and also a positive digit current is flowing in the digit line 52. In this state the two digit lines 51 and 52 are electromagnetically strongly coupled with each other, and large induced currents flow in these digit lines, which results in crosstalk. While, in the digit lines 61 and 62, negative digit currents flow, thereby electromagnetically coupling these digit lines.

As seen in FIG. 1, the digit lines 51 and 52 are disposed in parallel with each other, and, hence, electromagnetic coupling takes place over the full length of the two digit lines. This produces a large crosstalk.

Namely, when currents with the same polarities flow in the digit lines of mutually adjacent digit line pairs, the two digit lines are electromagnetically strongly coupled with each other, and a large crosstalk is produced. This seriously lowers the margin of the memory system. This phenomenon is present more conspicuously as the lengths of the digit lines increase.

Figure 2:
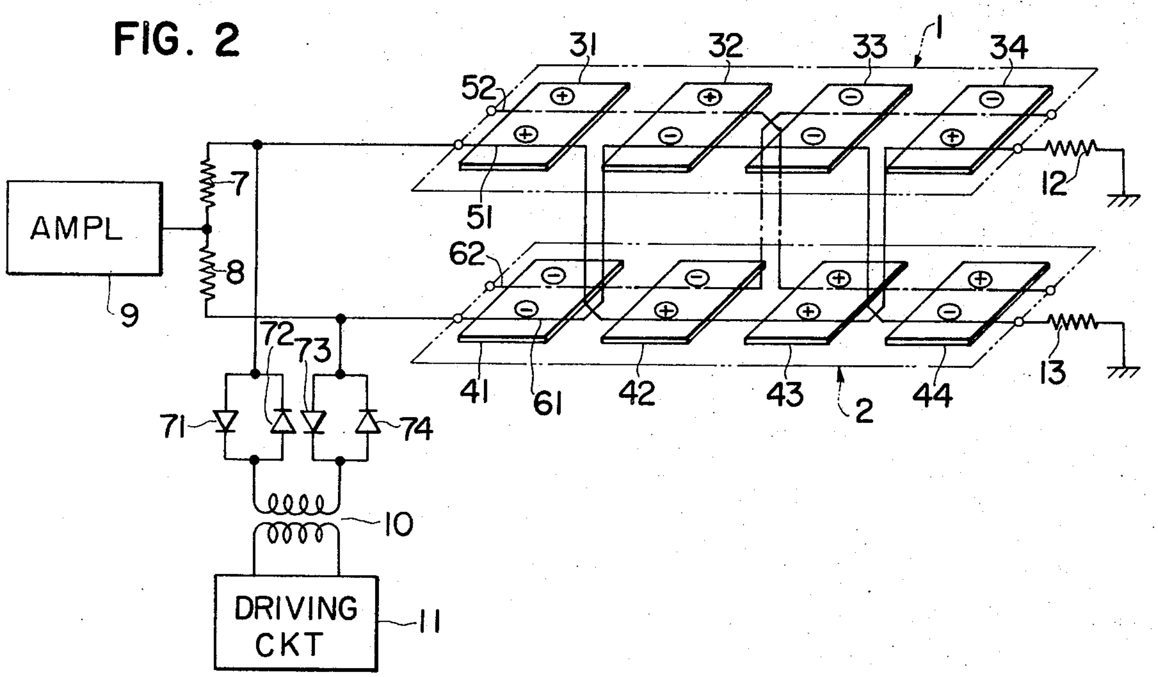
FIG. 2 is a schematic diagram showing the arrangement of a magnetic thin film memory embodying this invention.

FIG. 2 schematically shows a magnetic thin film memory in accordance with this invention. The arrangement of this memory is the same as that shown in FIG. 1, except for the manner of arrangement of the digit lines. For simplicity, only two mutually adjacent digit line pairs are illustrated, and one of these digit line pairs is indicated by dot-dash-lines for ease of identification.

In FIG. 2, the digit line 51 and its opposite digit line 61 are crossed over with each other between the connection part of the memory planes 31 and 32 and the connection part of the memory planes 41 and 42 and also between the connection part of the memory planes 33 and 34 and the connection part of the memory planes 43 and 44. In the same manner, the digit lines 52 and 62 indicated by dot-dash-lines are crossed over with each other between the connection part of the memory planes 32 and 33 and the connection part of the memory planes 42 and 43.

As a result, the digit lines 51 and 61 run by way of the memory planes 42 and 43 and the memory planes 32 and 33, respectively, in the mutually opposite memory arrays. Similarly, the digit lines 52 and 62 run by way of the memory planes 43 and 44 and the memory planes 33 and 34, respectively, in the mutually opposite memory arrays.

It is assumed that a positive digit current is flowing in the digit line 51, and a negative digit current in the digit line 61. Similarly, a positive current is flowing in the digit line 52, and a negative digit current in the digit line 62. In this state the currents with polarities as shown in FIG. 2 flow in the digit lines 51, 52, 61 and 62.

Viewing the digit line 51, only in the memory planes 31 and 43 is the line 51 adjacent to the digit line 52 so that only in these two planes is the current with the same positive polarity flowing in both the digit lines. In the memory planes 42 and 34 the line 51 is adjacent to the digit line 62 in which a current with the reverse or negative polarity is flowing. Therefore, in the memory planes 31 and 43, the mutually adjacent digit line pairs stand at the same polarity and cause a crosstalk. In the memory planes 42 and 34, however, the crosstalk takes place at opposite polarities and, hence, almost no crosstalk can be present as a whole.

In the conventional memory as illustrated in FIG. 1, the mutually adjacent digit line pairs are coupled with each other at the same polarity over the full length in each plane, to inevitably result in a large crosstalk. In FIG. 2, electromagnetic coupling between the mutually adjacent digit line pairs takes place at the same polarity only in the memory planes 31 and 43. This coupling, however, is canceled by the electromagnetic coupling produced in the memory planes 32 and 44 at the reverse polarity.

The digit line 61 comes close to the digit line 62 in the memory planes 41 and 33 where the two digit lines 61 and 62 are electromagnetically coupled with each other at the same polarity. In addition, the digit line 61 comes close to the digit line 52 in the memory planes 32 and 44, where the two digit lines are electromagnetically coupled with each other at the reverse polarity. Thus, the two electromagnetic coupling effects are canceled by each other. Similarly, as for the digit line 62, the electromagnetic coupling effects are canceled by each other.

In the magnetic thin film memory of this invention, therefore, the crosstalk due to electromagnetic coupling between the mutually adjacent digit line pairs can be minimized.

It is assumed that positive digit currents flow in the digit lines 51 and 62, and the negative digit currents flow in the digit lines 52 and 61. Even with such a condition, electromagnetic coupling at the same polarity takes place only in two memory planes where the electromagnetic canceling effect is also available. Hence, it is most desirable that the number of memory planes causing electromagnetic coupling at the same polarity be always nearly constant regardless of change in the polarity of the current flowing in the relevant digit lines.

It is apparent that the invention is equally effective on other digit lines in the memory stacks for the purpose of minimizing crosstalk. The position and the number of cross-points of digit lines are not limited to the above examples; these may be arbitrarily determined according to requirements of the particular application.

The number of memory planes across which the digit lines run in the mutually opposite memory arrays is not limited to two; it may be one or more than two. It is to be noted that the arrangement wherein the digit lines of mutually adjacent digit line pairs run by way of the mutually opposite memory arrays, with crossovers being identical anywhere, will result in no effect at all in view of the objects of this invention.

Figure 3:
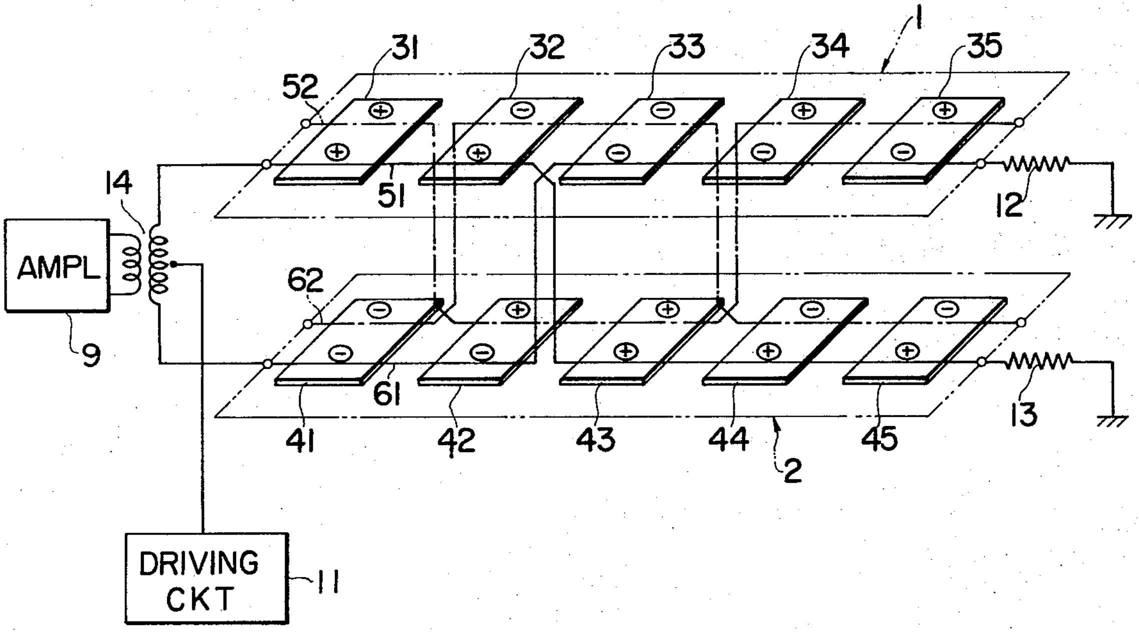
FIG. 3 is a schematic diagram showing another magnetic thin film memory embodying this invention.

FIG. 3 schematically illustrates another magnetic thin film memory embodying this invention wherein five memory planes are used per memory array. The memory arrays 1 and 2 consist of five memory planes 31 through 35 and five memory planes 41 through 45, respectively. For simplicity, only two mutually adjacent digit line pairs (51 and 61, and 52 and 62) are illustrated as in FIG. 2. The digit line pair (52 and 62) is indicated by dot-dash-lines.

As shown in FIG. 3, the digit line 51 and its opposite digit line 61 of the first digit line pair are crossed over with each other between the connection part of the memory planes 32 and 33 and the connection part of the memory planes 42 and 43. Also, the digit lines 52 and 62 (indicated by dot-dash-lines) of the second digit line pair adjacent to the first digit line pair are crossed over with each other between the connection part of the memory planes 31 and 32 and the connection part of the memory planes 41 and 42, and also between the connection part of the memory planes 33 and 34 and the connection part of the memory planes 43 and 44.

The digit lines 51 and 61 are grounded at one end by way of terminal resistors 12 and 13, and are commonly connected to a sense amplifier 9 at the other end by way of a transformer 14. A drive circuit 11 is connected to the center point of the secondary winding of the transformer 14. These elements are operable the same as those shown in FIGS. 1 and 2, and may be replaced with the identical elements used in the memories in FIGS. 1 and 2.

In FIG. 3, it is assumed that a positive digit current is flowing in the digit line 51, while a negative digit current flows in the digit line 61, and that a positive digit current is flowing in the digit line 52, while a negative digit current flows in the digit line 62. Under this condition, the currents with polarities as shown in FIG. 3 flow in these digit lines.

Viewing the digit line 51, the polarity is the same as that of the adjacent digit line only in the memory planes 31 and 43, and the crosstalk due to electromagnetic coupling takes place only in these planes. As a result, the crosstalk is markedly reduced, in comparison with the prior art. In the memory planes 32, 44 and 45, the digit line polarity is reversed, to cause reverse electromagnetic coupling and thus to further reduce the crosstalk.

If the digit currents flowing in the digit lines 52 and 62 have opposite polarities, i.e., a negative current in the digit line 52 and a positive current in the digit line 62, the digit line 51 stands at the same polarity in the memory planes 32, 44 and 45. In such case, strong electromagnetic coupling takes place in these memory planes. Nevertheless, the overall crosstalk is much less than in the prior art.

In the foregoing embodiments, the number of memory planes used per memory array is four, as seen in FIG. 2, or five, as seen in FIG. 3. The invention is not limited to these examples. The number of memory planes per memory array may be suitably determined according to the particular requirements of the application.

To illustrate the invention, one example wherein an array group comprises two memory arrays has been described. Instead of one array group, many number of memory array groups may be used. To this end, suitable connections are to be made among the memory arrays.

While the principles of the invention have been described above in connection with specific embodiments, and particular modifications thereof, it is to be clearly understood that this description is made only by way of example and not as a limitation on the scope of the invention.

What is claimed is:

1. A magnetic thin film memory of the one memory cell per stored bit type, comprising: at least one memory array group consisting of first and second memory arrays each including a succession of memory planes, said memory array group including a plurality of digit line pairs each comprising respective first and second digit line portions disposed in mutually corresponding positions in respective memory planes of said first and second memory arrays, respectively, and a plurality of word lines disposed perpendicular to said digit lines; connection means for connecting the respective digit line portions of each digit line pair to the digit line portions of the succeeding digit line pair so as to form an arrangement of digit lines extending through said first and second memory arrays, at least one of the digit line pairs having the first digit line portion thereof connected to the second digit line portion of the succeeding digit line pair and the second digit line portion thereof connected to the first digit line portion of said succeeding digit line pair so that part of at least one of said digit lines runs by way of at least one memory plane of both of said first and second memory arrays; and drive means for supplying mutually opposite polarity digit currents to the respective first and second digit lines.

2. A magnetic thin film memory as defined in claim 1, further comprising sensing means connected in common to said pairs of digit lines for sensing the data stored at the cross-points of said digit lines and said word lines.

3. A magnetic thin film memory as defined in claim 2, wherein said memory array group includes two mutually adjacent memory arrays.

4. A magnetic thin film memory of the type having intersecting digit lines and word lines which forms a matrix of data storing cross-points, comprising:

at least one memory array group including at least two memory arrays each comprising a succession of memory planes, said two memory arrays being superimposed one above the other so that the respective memory planes of one memory array form memory plane pairs with those of the other memory array in said memory array group, a plurality of digit lines disposed in a plurality of substantially parallel pairs of first and second digit lines formed of line portions positioned in corresponding locations on the memory planes in the two memory arrays, respectively, and connecting portions interconnecting the line portions between the memory planes of different memory plane pairs, the first and second digit lines of at least one of said digit line pairs being disposed to cross over between the memory arrays so that part of at least one digit line of one digit line pair passes through at least one memory plane of different memory plane pairs of both of said pair of memory arrays, and a plurality of word lines disposed perpendicular to said digit lines.

5. A magnetic thin film memory according to claim 4 wherein a plurality of drive sources are connected respectively to said digit line pairs to supply currents of opposite polarity to the respective first and second digit lines thereof.

6. A magnetic thin film memory according to claim 5, further comprising sensing means connected in common to said pairs of digit lines for sensing data stored at the cross-points of said digit lines and said word lines.

7. A magnetic thin film memory according to claim 6 wherein said memory arrays each include at least four memory planes, one pair of said digit lines being crossed over between the first and second and between the third and fourth memory planes, and the adjacent pair of said digit lines being crossed over between the second and third memory planes.

8. A magnetic thin film memory according to claim 7 wherein said memory arrays each include at least five memory planes.

* * * * *